US006341162B1

(12) United States Patent
Kelly et al.

(10) Patent No.: US 6,341,162 B1
(45) Date of Patent: Jan. 22, 2002

(54) TELECOMMUNICATIONS INTELLIGENT NETWORK

(75) Inventors: Bryce B Kelly, Ipswich (GB); Darren Richard Kaye, Amsterdam (NL)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/043,059

(22) PCT Filed: Sep. 11, 1997

(86) PCT No.: PCT/GB97/02439

§ 371 Date: Mar. 11, 1998

§ 102(e) Date: Mar. 11, 1998

(87) PCT Pub. No.: WO98/11738

PCT Pub. Date: Mar. 19, 1998

(30) Foreign Application Priority Data

Sep. 16, 1996 (EP) ............................................. 96306689

(51) Int. Cl.[7] ................................................ H04M 7/00
(52) U.S. Cl. ............................ 379/221.09; 379/207.02; 379/229
(58) Field of Search ................................. 379/230, 229, 379/219, 220.01, 221.01–221.15, 207.01, 207.16

(56) References Cited

U.S. PATENT DOCUMENTS

| | | | | |
|---|---|---|---|---|
| 5,533,106 A | * | 7/1996 | Blumhardt | 379/142 |
| 5,550,907 A | * | 8/1996 | Carlsen | 379/207 |
| 5,563,941 A | * | 10/1996 | Stademann | 379/266 |
| 5,570,420 A | * | 10/1996 | Bress et al. | 379/220 |
| 5,592,541 A | * | 1/1997 | Fleischer, III et al. | 379/211 |
| 5,602,903 A | * | 2/1997 | LeBlanc et al. | 455/456 |
| 5,664,102 A | * | 9/1997 | Faynberg | 379/207 |
| 5,701,412 A | * | 12/1997 | Takeda et al. | 379/201 |
| 5,832,064 A | * | 11/1998 | Jeong | 379/92.02 |
| 5,839,076 A | * | 11/1998 | Becher | 455/461 |
| 5,878,128 A | * | 3/1999 | Kantola | 379/230 |
| 5,889,848 A | * | 3/1999 | Cookson | 379/230 |
| 5,930,348 A | * | 7/1999 | Regnier et al. | 379/221 |
| 5,940,378 A | * | 8/1999 | Ushiki et al. | 379/201 |
| 6,016,337 A | * | 1/2000 | Pykalisto | 379/92.02 |
| 6,044,264 A | * | 3/2000 | Houtari et al. | 455/414 |

FOREIGN PATENT DOCUMENTS

EP 0667722 8/1995

OTHER PUBLICATIONS

Optimizing Remote vs Local Control of Standard Call Setup Procedures In A Distributed Network Control Architecture (1988 IEEE, pp. 605–609).*

A Methodology For Feature Interaction Detection in the AIN 0.1 Framework (1998 IEEE, pp. 797–817).*

Vaphease et al, "Advanced Intelligent Network: Evolution", International Conference on Communications, vol. 2, Jun. 23–26, 1991, Denver US, pp. 941–947, XP000269624.

Elixmann et al, "Open Switching—Extending Control Architectures to Facilitate Applications", International Switching Symposium, vol. 2, Apr. 23–28, 1995, Berline DE, pp. 239–243, XP000495660.

* cited by examiner

Primary Examiner—Ahmad Matar
Assistant Examiner—Benny Q. Tieu
(74) Attorney, Agent, or Firm—Nixon & Vanderhye P.C.

(57) ABSTRACT

A telecommunications network using an intelligent network architecture per forms detection point processing for a call switched by a service switching point at a service control point which is at a location remote from the service switching point. A trigger table to use in detection point processing may be distributed between the service switching point and the service control point. Part of the trigger table may be downloaded to the service switching point from the service control point when required for a particular call.

18 Claims, 12 Drawing Sheets

TELECOMMUNICATIONS INTELLIGENT NETWORK

BACKGROUND OF THE INVENTION

1. Field of the Invention

The present invention relates to a telecommunications network using an intelligent network (IN) architecture.

2. Related Art

The IN architecture has been developed to allow telecommunications networks to support services in a flexible and efficient manner. A fundamental feature of IN is the separation of call processing in a service switching point (SSP) from service control logic in a service control point (SCP). This separation allows the SSPs to be developed with a basic set of functions. To provide additional functions, control is passed out to an SCP at appropriate times during a call. The relevant service logic is then run at the SCP. The times at which control is passed to the SCP are known as detection points or DPs.

Conventionally, service switching functions (SSFs) have been carried out at the service switching point (SSP). The SSFs include the monitoring of the state of a call and when a detection point is reached checking with reference to a local trigger table to see if criteria appropriate to the detection point are met. If they are, then the SSF passes control to the service control point (SCP). The checking of call status against criteria appropriate to a given detection point is termed detection point processing.

SUMMARY OF THE INVENTION

According to a first aspect of the present invention, there is provided a method of operating a telecommunications intelligent network in which detection point processing for a call switched by a service switching point (SSP) is carried out at a service control point (SCP) remote from the SSP.

By contrast with the conventional approach in which all service switching functions (SSFs) have been carried out at the SSP, the present inventors have found that marked advantages are achieved by separating out the detection point processing and carrying out that part of the SSF at the service control point (SCP). This allows a process which is particularly computationally intensive to be run on a specialised platform. It also serves to weaken the association between a customer and a particular line at a given SSP. Typically a national network, such as the UK PSTN, might require many hundreds of local switches but possibly as few as four SCP's. By storing the customer profile required for detection point processing centrally at the SCP's, maintenance and updating of this data is greatly facilitated and service management is simplified. Since customer data need no longer be tied to a specific local switch, the invention helps to support customer mobility on a fixed network.

Preferably the method includes storing a trigger table for detection point processing distributed between the SCP and the SSP. Preferably all of the trigger table is stored initially at the SCP, and part of the trigger table is downloaded to the SSP when the call switched by the SSP is initiated.

In the preferred implementation of the invention, a trigger table for use in detection point processing is distributed between the SSP and the SCP. It is particularly advantageous to store all of the table at the SCP, and to download data to the SSP only as required when a call is initiated. In this way, the link between a customer and a local switch is established dynamically and transiently for the duration of a call, and can readily be established at a different location for a subsequent call.

Preferably the method includes transmitting a request for detection point processing from the SSP to the SCP when during the progress of a call, a detection point occurs. Preferably the method includes storing data indicating the armed status of a detection point locally at the SSP, and the said step of transmitting a request for DP processing from the SSP to the SCP is carried out only for those detection points which are armed.

In this preferred approach to implementing the invention, while substantially all DP processing is carried out remotely, information on whether each DP is armed is made available locally at the SSP, for example by downloading that part of the trigger table which carries this data when the call is initiated. This has the effect of reducing the amount of signalling necessary between the SSP and the SCP.

Preferably the said step of storing data includes storing arming type information indicating whether the DP is of a request or notification type, and the method includes suspending processing of a call when an armed DP is encountered only if the DP is of the request type.

The efficiency of operation of the system is further enhanced if in addition the service switching point stores DP arming type information locally. This ensures that local processing of the call is suspended only when necessary, that is when the detection point is of the request type. Preferably this approach is implemented by providing a trigger table which is distributed between SCP nd the SSP. The trigger table in the SCP will then contain the data necessary for DP processing, whilst the table in the SSP retains the data necessary for identifying armed DPs and call suspension criteria.

According to a second aspect of the present invention, there is provided a telecommunications intelligent network comprising:

a service switching point (SSP); and a service control point (SCP) which is remote from the SSP and which includes detection point processing means for processing a call switched by the SSP.

The invention also encompasses a service control point and a method of operating a service control point.

BRIEF DESCRIPTION OF THE DRAWINGS

Systems embodying the present invention will now be described in further detail, by way of example only, with reference to the accompanying drawings, in which.

DETAILED DESCRIPTION OF EXEMPLARY EMBODIMENTS

Figure 1:
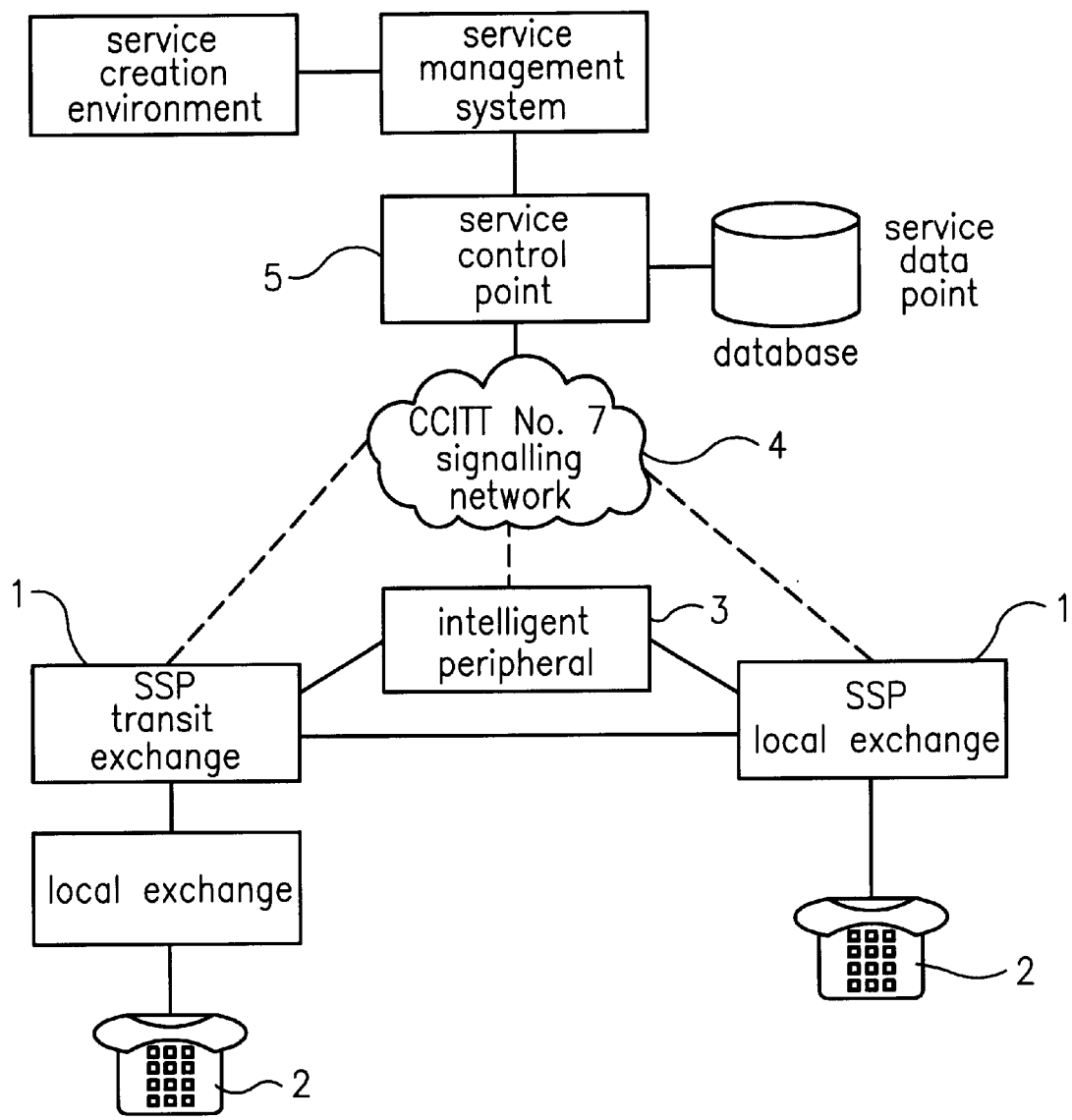
FIG. 1 is a schematic of a telecommunications network employing an IN architecture.

A telecommunications network employing an intelligent network (IN) architecture includes a number of service switching points (SSPs) 1 which may be located, for example, at a transit exchange or local exchange. Subscriber terminals 2 are connected, directly or indirectly, to the SSP. The SSP carries out a call control function (CCF) which comprises the basic call processes associated with the setting up of a connection between different terminals on the network. In addition the SSP includes a service switching function (SSF) which interfaces the call control function to other entities and functions on the network. These other entities may include an intelligent peripheral (IP) 3 which in conjunction with the SSP makes available specialised resource functions (SRFs).

A service control point (SCP) 5 is connected to the service switching points 1 and the intelligent peripheral 3 via a signalling network 4. This network uses a digital message-based common channel signalling system known as signalling system number 7 (SS7). The SS7 signalling system is described in further detail in Fretten K G and Davies C G: "CCITT Signalling System Number 7, Overview", British Telecommunications Eng. J (April 1989).

For completeness, the diagram of FIG. 1 includes the service creation environment and service management system associated with the service control point.

In operation, enhanced call control functions run on the service control point, while the basic service switching is carried out by the service switching point. This allows the progression of a call to be suspended while further information regarding how the call is to be handled is obtained from a service data point (SDP) linked to the service control point. The decision to suspend call processing is based on the meeting of certain pre-specified criteria termed "triggers". These may be, for example, certain dialled digits or line conditions at points during the call.

Figure 3:
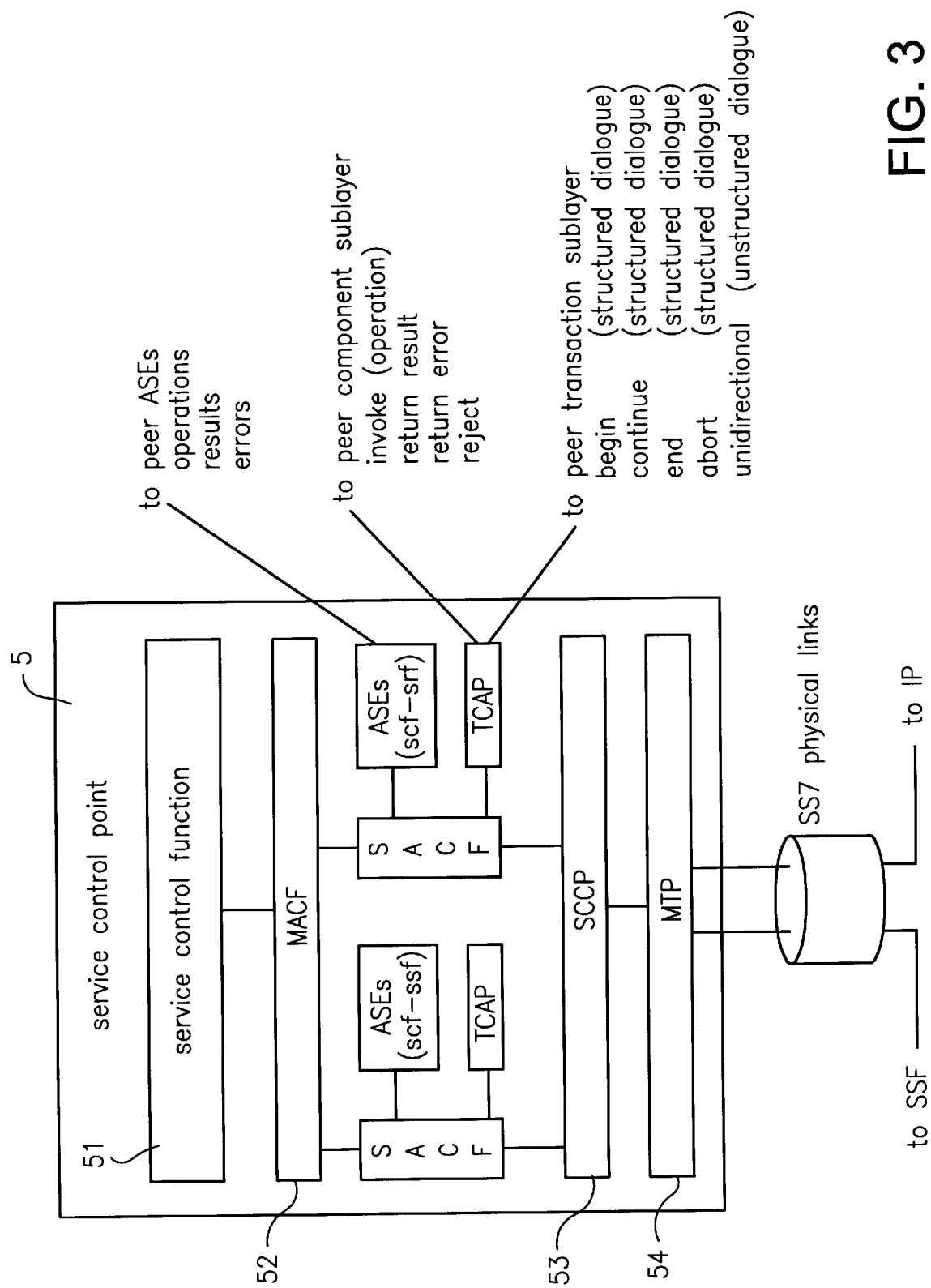
FIG. 3 is a schematic showing in further detail the structure of the SCP.

FIG. 3 shows in further detail the architecture of the service control point in terms of protocol layers. The highest level function, the service control function 51, is supported by an MACF (multiple application control function) layer 52. This in turn controls a number of SACF (single application control function) modules, each with associated ASE's (application service elements) and TCAP (transaction capabilities application part) sub-layer. As indicated on the Figure, the ASE's communicate operations, results and errors with peer ASEs. These higher level protocols are supported by SCCP 53 and MTP (message transport protocol) layers 54 which handle messaging via an SS7 link. In the example, the SS7 link connects the SCP to the SSP used to implement the service switching function, and to an intelligent peripheral (IP), for example a messaging platform. The service control point is implemented on a general-purpose computing platform that hosts advanced service control software or service logic.

The structure and operation of the network, other than in the aspects described in further detail below, are generally conventional in nature and are not further described here. Further information on the IN architecture is contained in the paper by T W Abernethy & A C Munday, "Intelligent Networks, Standards and Services", BT Technol J, Vol. 13, No. 2, April 1995 and in the European Telecommunications Standards Institute Final Draft PRETS 300374-1, published July 1994, the contents of which are incorporated herein by reference.

Figure 2A:
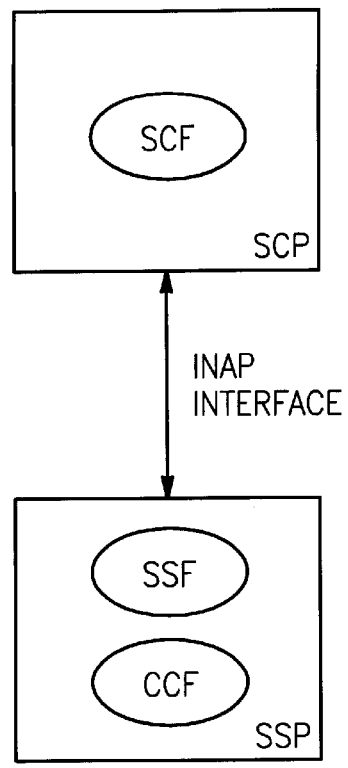
FIGS. 2a and 2b are schematics showing functional to physical mappings for the SCP and SSP in a conventional system and in a system embodying the present invention respectively.
Figure 2B:
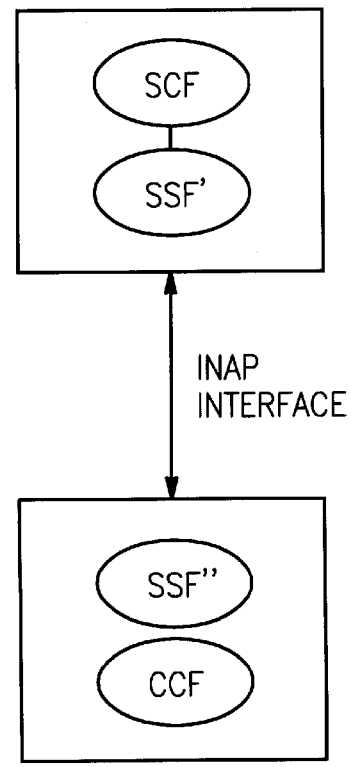

In a network embodying the present invention, as in the conventional IN networks, the progress of a call is determined in the first instance by software running at the SSP implementing the call control function (CCF). The call control functions are interfaced to service control functions at the SCP by the service switching function (SSF). In particular the SSF is responsible for suspending processing of the call by the SSF and transferring control to the SCF when, at a detection point, the trigger criteria are fulfilled. Conventionally, as shown in FIG. 2a, all of the service switching functions have been implemented locally at the SSP. By contrast, in a network embodying the present invention, that part of the service switching functions which relates to detection point (DP) processing is separated out from the other functions and implemented remotely from the SSP at the service control point. This arrangement is shown in FIG. 2b, in which SSF' denotes the DP processing functions, and SSF" denotes the SSF functions described in ITU-T recommendation Q.1200 series, other than the DP processing functions. Since now the SSP does not include the DP processing functions, it must refer to the SCP when each DP in the CCF is encountered. The real time data associated with the call instance to be checked against the criteria data must also be passed to the SCP for each DP encountered. This data is passed in the INAP signalling, with extension being made where necessary to the message definitions. The INAP protocol is set out in the ETSI publication cited above.

To reduce the amount of unnecessary signalling between the SSP and the SCP, the DP arming information is retained within the SSP. This information is used to record whether or not each DP is armed and therefore indicates whether or not referral needs to be made to an SCP for DP processing and possibly execution of the service logic. Additionally that DP arming type information is retained within the SSP. This records if armed DPs are of the 'Request' or 'Notification' type. This information will allow the SSP to make a decision on whether or not to suspend call processing whilst referring to the SCP for DP processing or execution of service logic.

The result of taking this approach is to obtain a trigger table which is distributed between the SCP and the SSP. The trigger table in the SCP contains the data necessary for DP processing whilst the table in the SSP retains the data necessary for identifying armed DPs and call suspension criteria. Both of these may have static and dynamic parts relating to permanent and call-time-related service triggers respectively. The characteristics of this distribution are appealing from a service management viewpoint as all service related information and logic is located within the SCPs rather that distributed between SCPs and the core network.

Figure 7A:
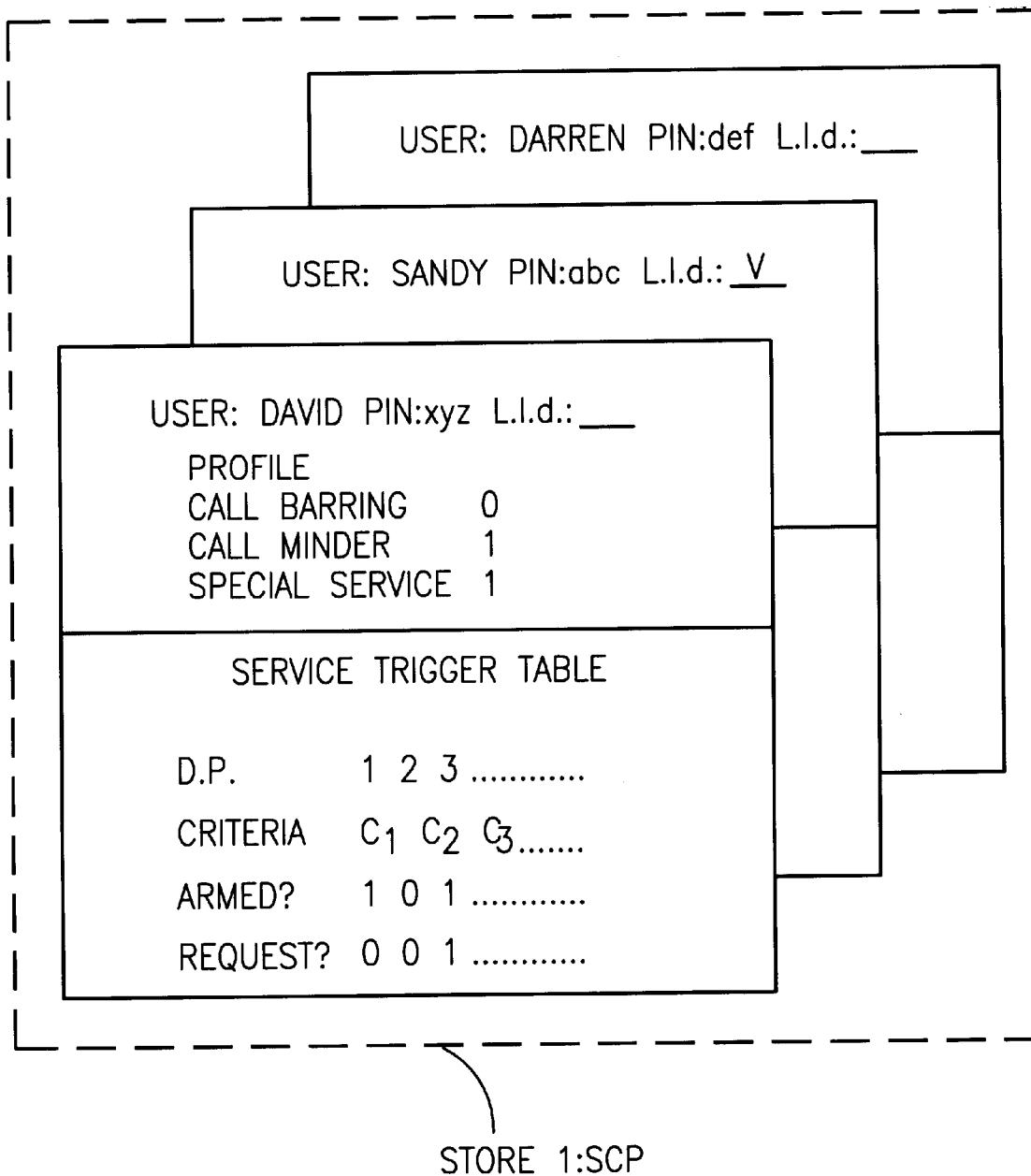
FIGS. 7a and 7b show trigger tables for the system of FIG. 4.
Figure 7B:
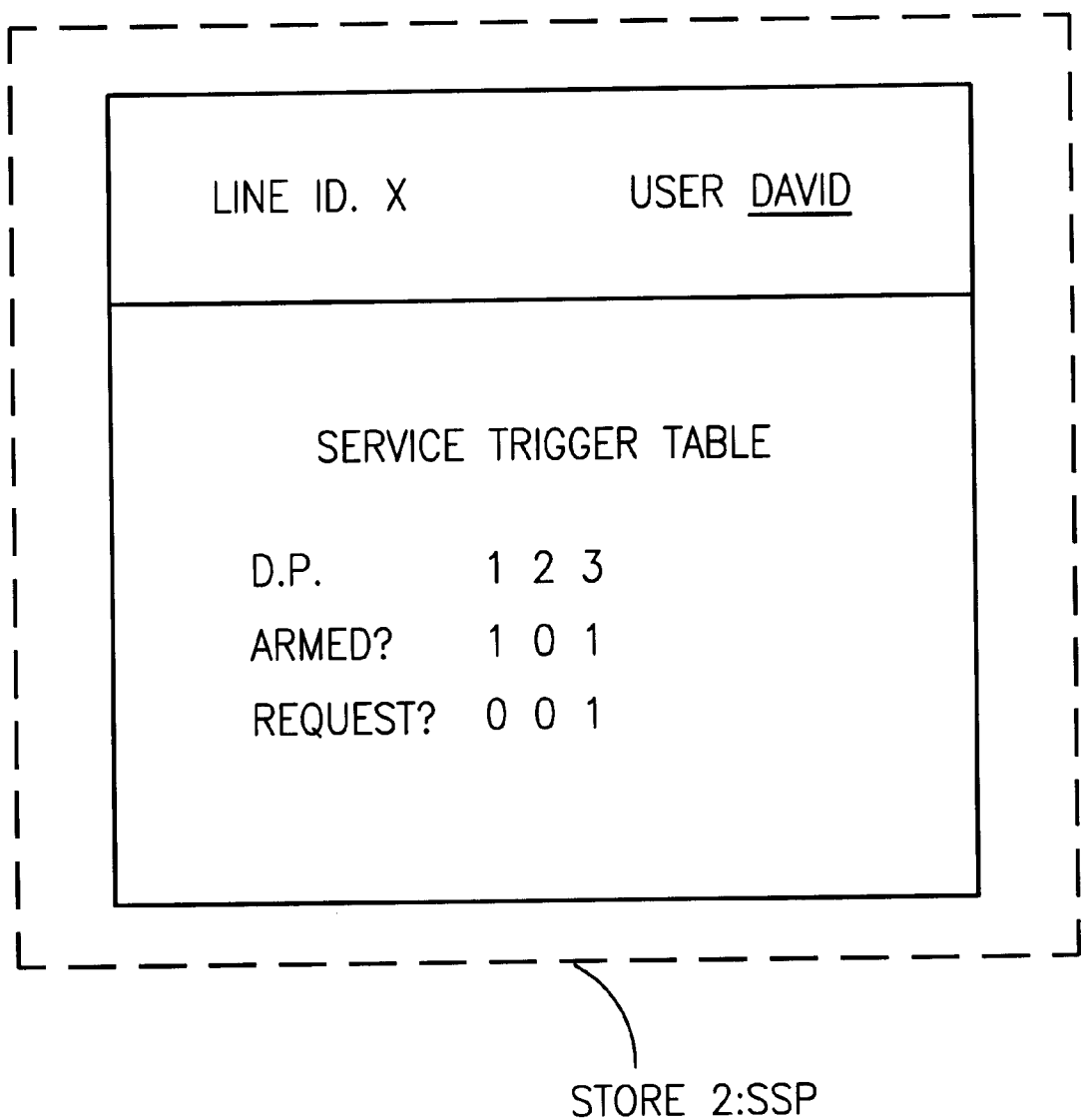

FIGS. 7a and 7b show an example of trigger data stored at the SCP and SSP respectively. In the SCP the data of store 1 may be stored, for example, on the mass storage device of an associated service data point. In the SSP, store 2 may be located in a region of RAM associated with the SSF processor. At the SCP, a user profile is stored for each customer. The profile may include, for example, details of services which the user has subscribed to, and details of any services which are barred. The store also includes trigger tables for the appropriate services. When a call is initiated, the SCP identifies the relevant service, for example an 0800 service, and downloads part of the relevant trigger table to the SSP. Specifically, the SCP downloads that part of the trigger table which records the armed status and arming type for the trigger points. The trigger criteria remain at the SCP only. Thus the SSP has only the data necessary to determine whether processing at the SCP is necessary, and whether call progression should be interrupted while that processing is carried out. At a detection point for which these conditions are fulfilled, for example DP3 in FIG. 7a, then the SSP transmits the request for detection point processing together with the necessary call-related data to the SCP.

Figure 6:
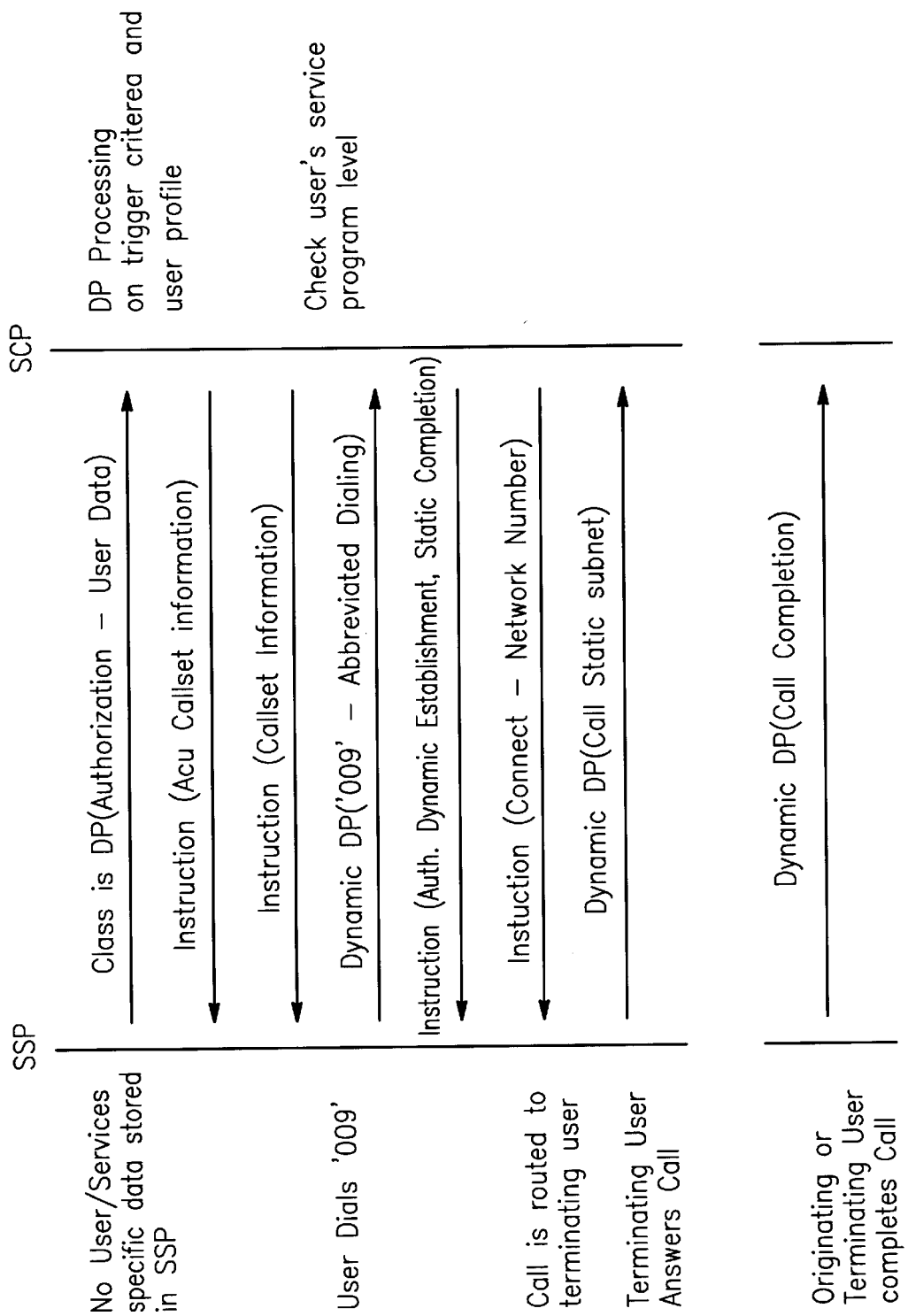
FIG. 6 is a diagram showing information flows in the system of FIG. 5.
Figure 11:
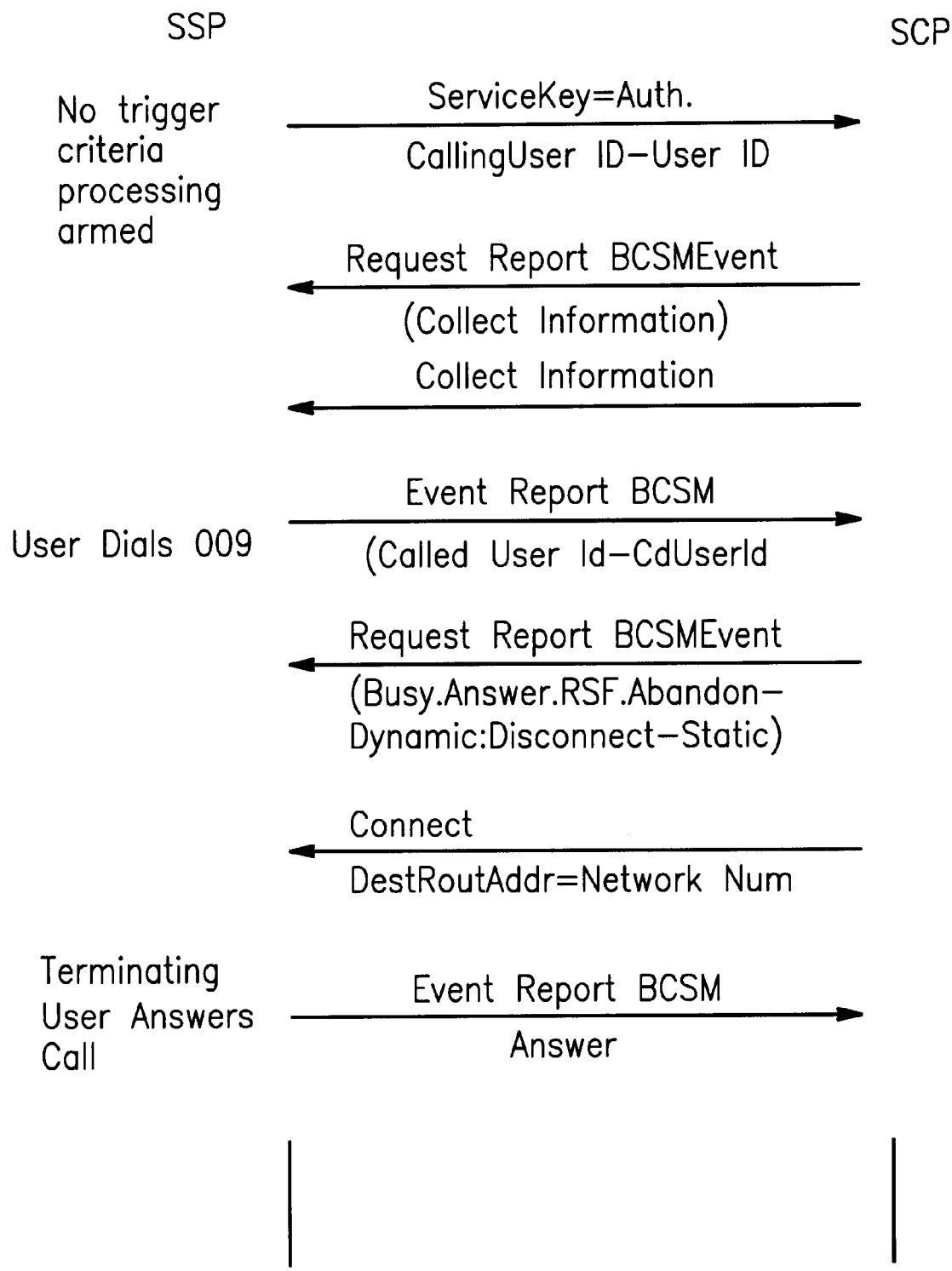
FIG. 11 is a diagram showing INAP message flows in the system of FIG. 8.

FIG. 6 shows the information flows in a system embodying the present invention, and FIG. 11 shows how those information flows are implemented using an INAP interface. Data for trigger criteria checking is exported in the Initial DP and Event Report BCSM messages. After the Event Report BCSM, if the DP criteria are not met, then a Continue message is sent to the SSP. If, as in the example illustrated, the DP criteria are met, then Request Report BCSM Event and Connect are sent to the SSP. On the SSP side the only processing required is to check if any DP which is encountered is armed.

This approach can be used to break the fixed association between a line, group of lines or trunk and statistically provisioned triggers, for example for providing a fixed set of services on a given line. Instead with the dominantly customer and service specific information residing in the SCP it is possible to customise a line dynamically, possibly on a per call basis, for the actual customer making the call. The reason for this is that the SSP supporting the customer need only know of the location of the calling customer SCP to allow all customer and service specific functions to be performed for that IN call.

Figure 8:
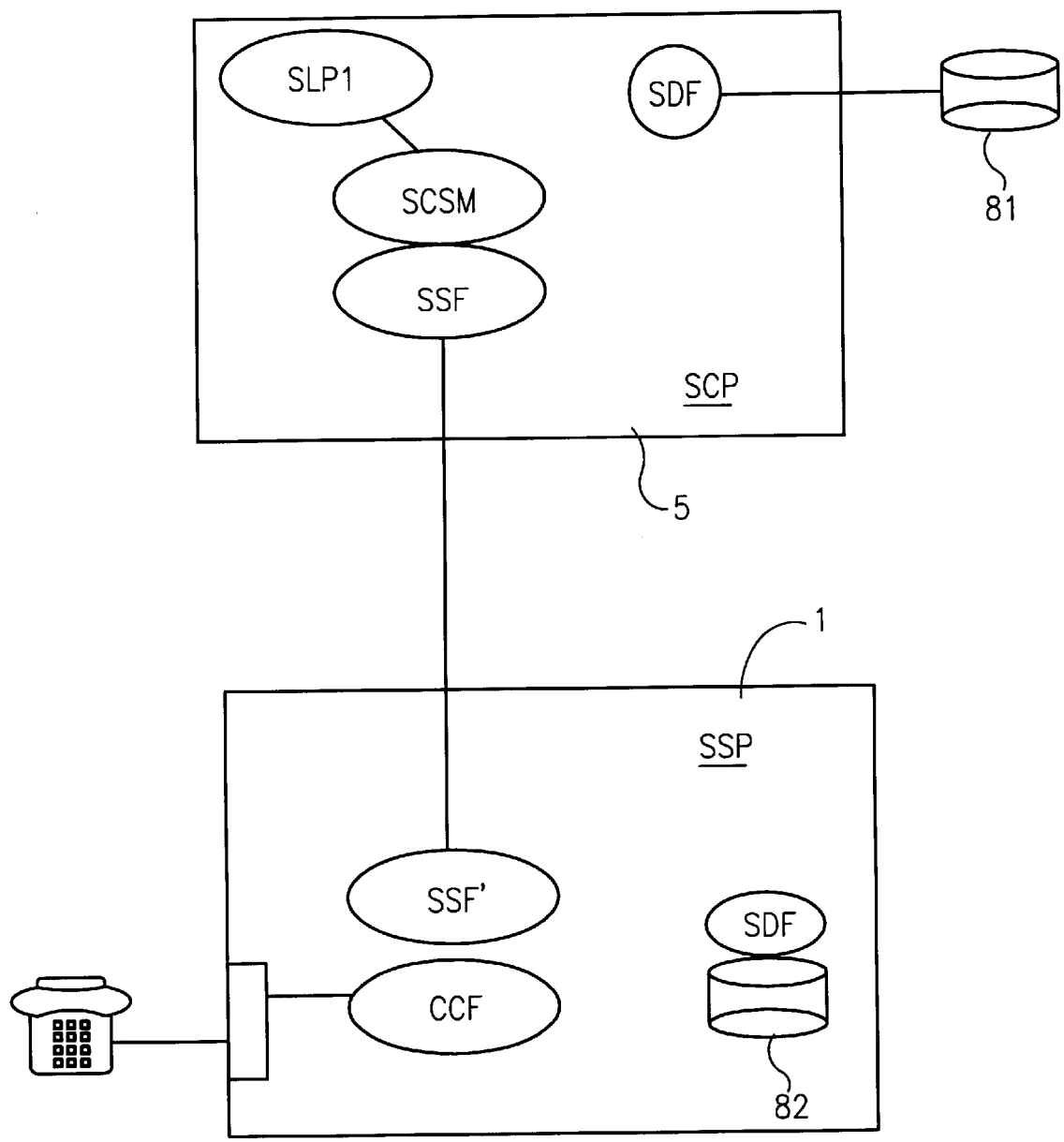
FIG. 8 is a diagram showing the functional architecture of a service control point and service switching point.

FIG. 8 shows the functional architecture of the service control point and service switching point as modified to implement the present invention. User profiles, trigger criteria and other data required for the service control functions are stored in a database 81. Although shown as a separate component in this example, the database may alternatively be integrated with the SCP. SSF and SSF' in the service switching point and service control point respectively perform SSP to SCP protocol control. Within the SCP, the SSF' communicates with the database 81 via a SDF (service data function) module. This module is responsible for managing transactions with the database and accesses trigger arming data. From the user profile stored in the database 81, the SSF' module determines whether any IN request from the SSP requires further processing by Service Logic Programs. If it does then an instance of the relevant service logic program, such as SLP1 in the example illustrated, is created and executed.

For each call, data required locally at the SSP, such as the trigger point armed/status, are downloaded from database 81 to a local SSP database 82. No data for trigger criteria processing are required locally for the SSP database. The SSP database 82 has a corresponding SDF module associated with it. The data downloaded from the SCP database 81 are used by the SSP service switching function to determine when during the course of a call it is necessary to request detection point processing by the SCP.

Figure 9:
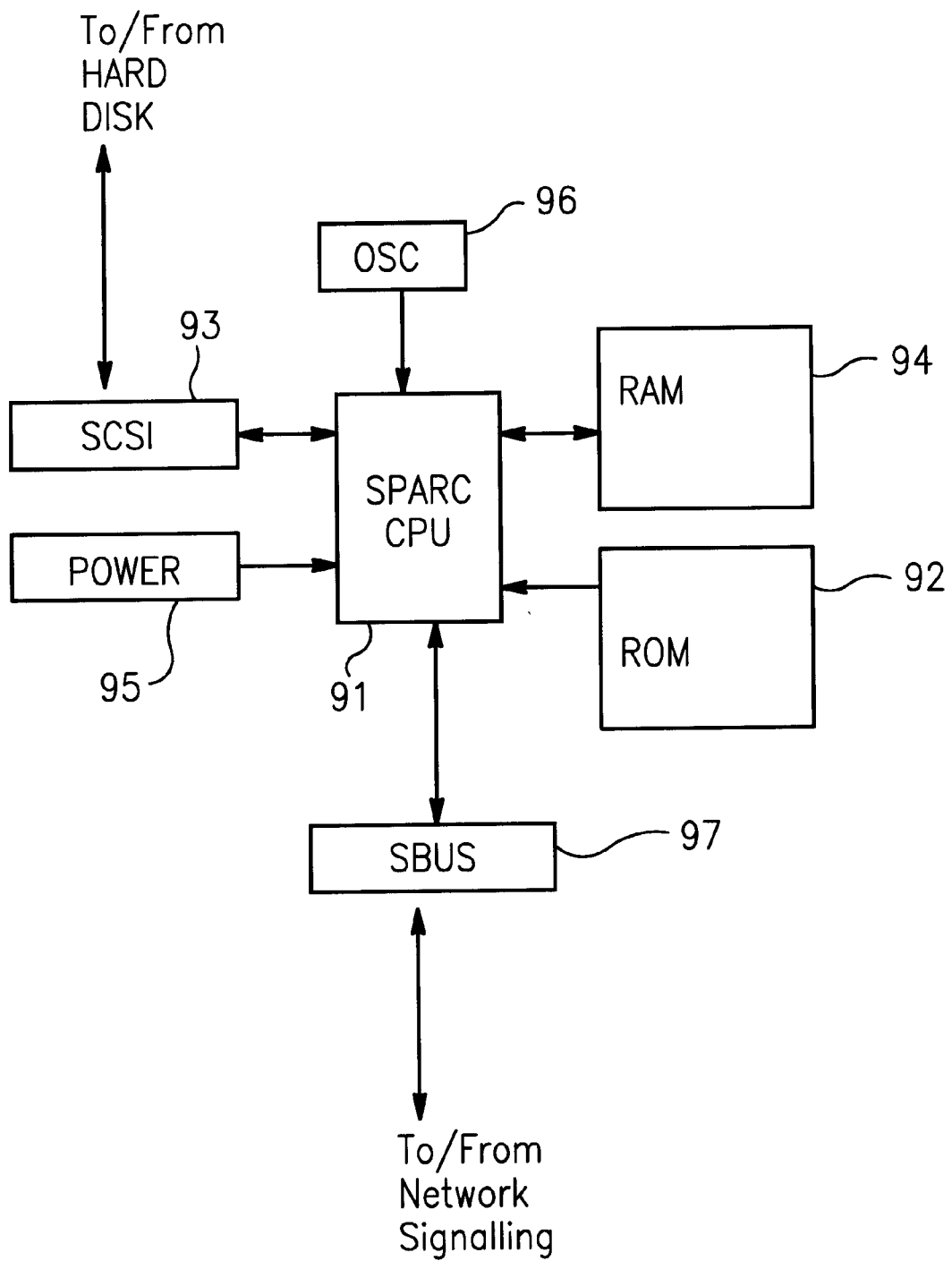
FIG. 9 is a schematic of a platform for implementing the SCP of FIG. 8.

FIG. 9 shows schematically one example of a hardware platform suitable for implementing the SCP described above. A CPU 91, which in this example is a an UltraSPARC microprocessor available commercially from Sun Microelectronics Inc., runs instances of the processes SSF', SCSM, SLP1 and SDF. The corresponding software modules are stored locally in ROM 92. The SDF module accesses data from a local hard disk via SCSI interface 93. Retrieved data is stored during the course of a call in RAM 94, which also provides working memory for the execution of the software modules. The system is built as a rack-mounted card and is linked to other cards by a high speed bus interface 97. The other cards (not shown) include network signalling interfaces which communicate signals received from the network, and in particular signals from the SSP, to the SCP processor 91. The other components shown in the Figure comprise a power supply 95 and local oscillator 96.

Figure 10:
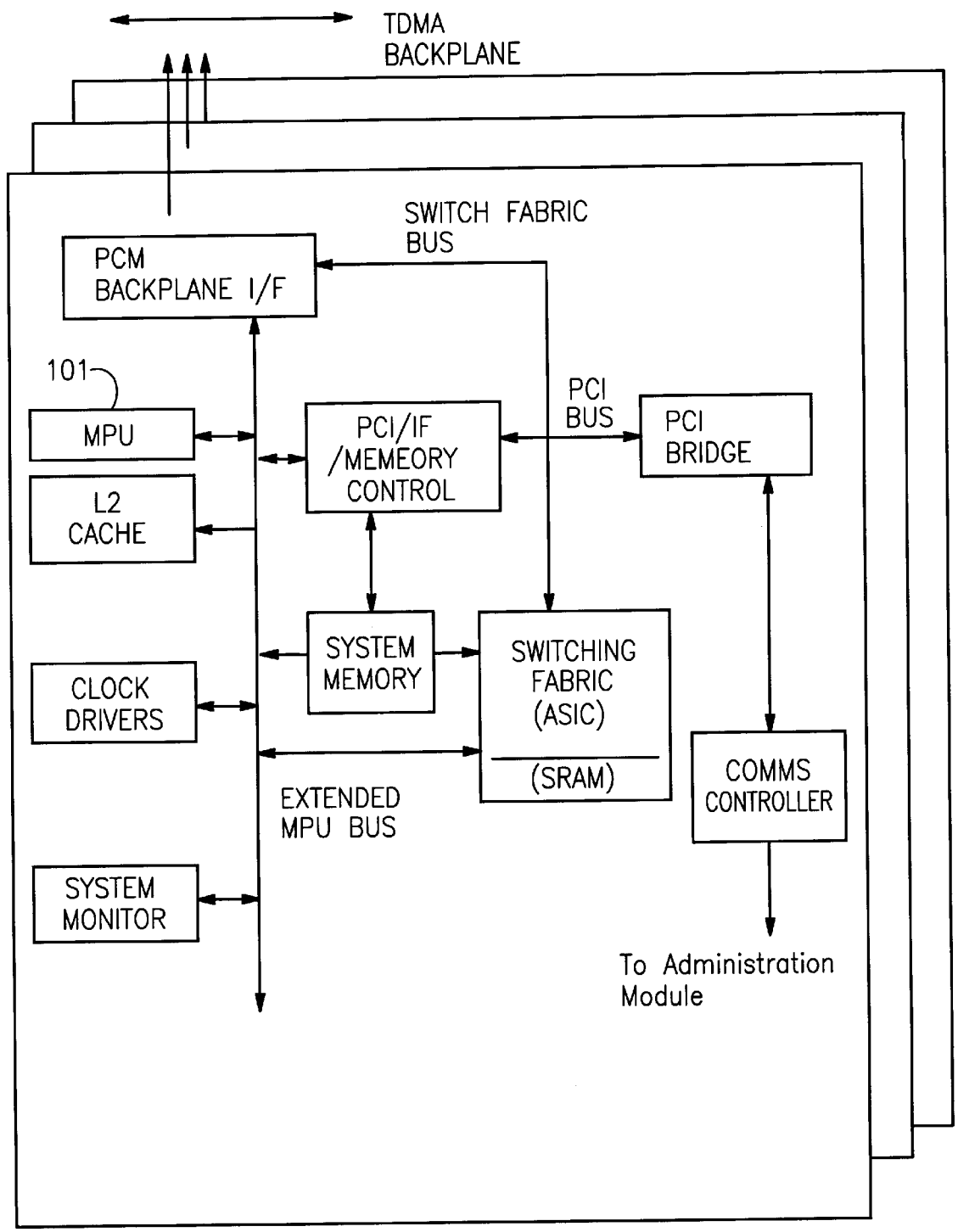
FIG. 10 is a schematic of a platform for implementing the SSP of FIG. 8.

FIG. 10 shows schematically one example of a hardware platform for implementing the SSP functions described above. The control functions in the SSP are less computationally intensive than those in the SCP and so a relatively lower powered microprocessor is used to implement those functions. In this example the MPU 101 is a PowerPC 603 processor available commercially from Motorola. An MPU bus links the microprocessor to local system memory which is used to store that part of the trigger table which is downloaded from the SCP. The telephony signals switched by the module are transmitted as PCM signals along a TDMA backplane which links the switching module to other cards. Multiple MPU cards are run in parallel to provide fault tolerance and the software is arranged to switch rapidly between processors in the event of a hardware failure.

Example Service

The following example illustrates how the physical separation of the DP processing from the Service Switching Point (SSP) allows dynamic customisation of the line for the actual user making the call. In the example the originating and terminating users are subscribed to personal numbering services which allow them to register to any line within the network.

Figure 4:
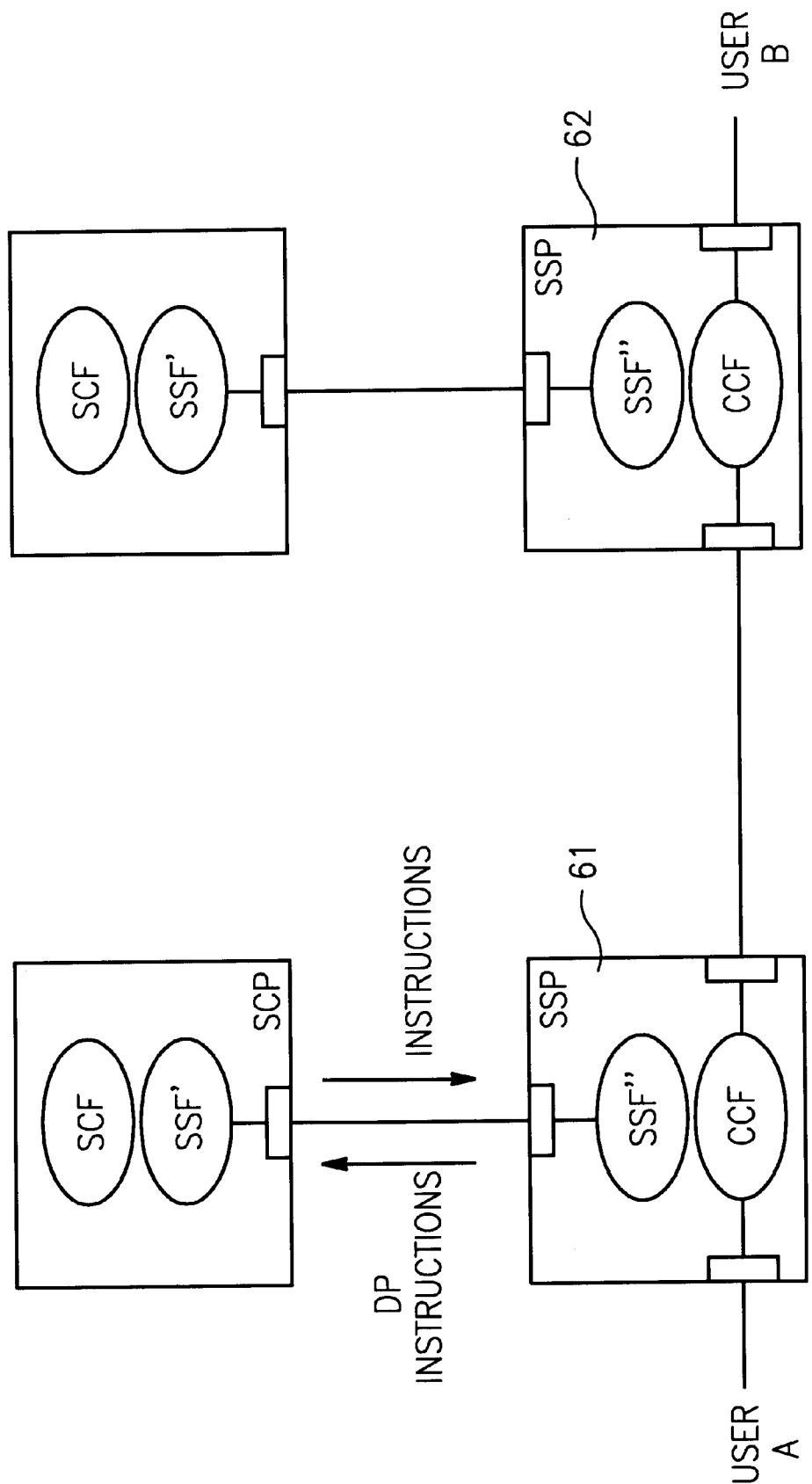
FIG. 4 shows the functional and physical architecture of components of a system embodying the present invention configured for a personal numbering service.
Figure 5:
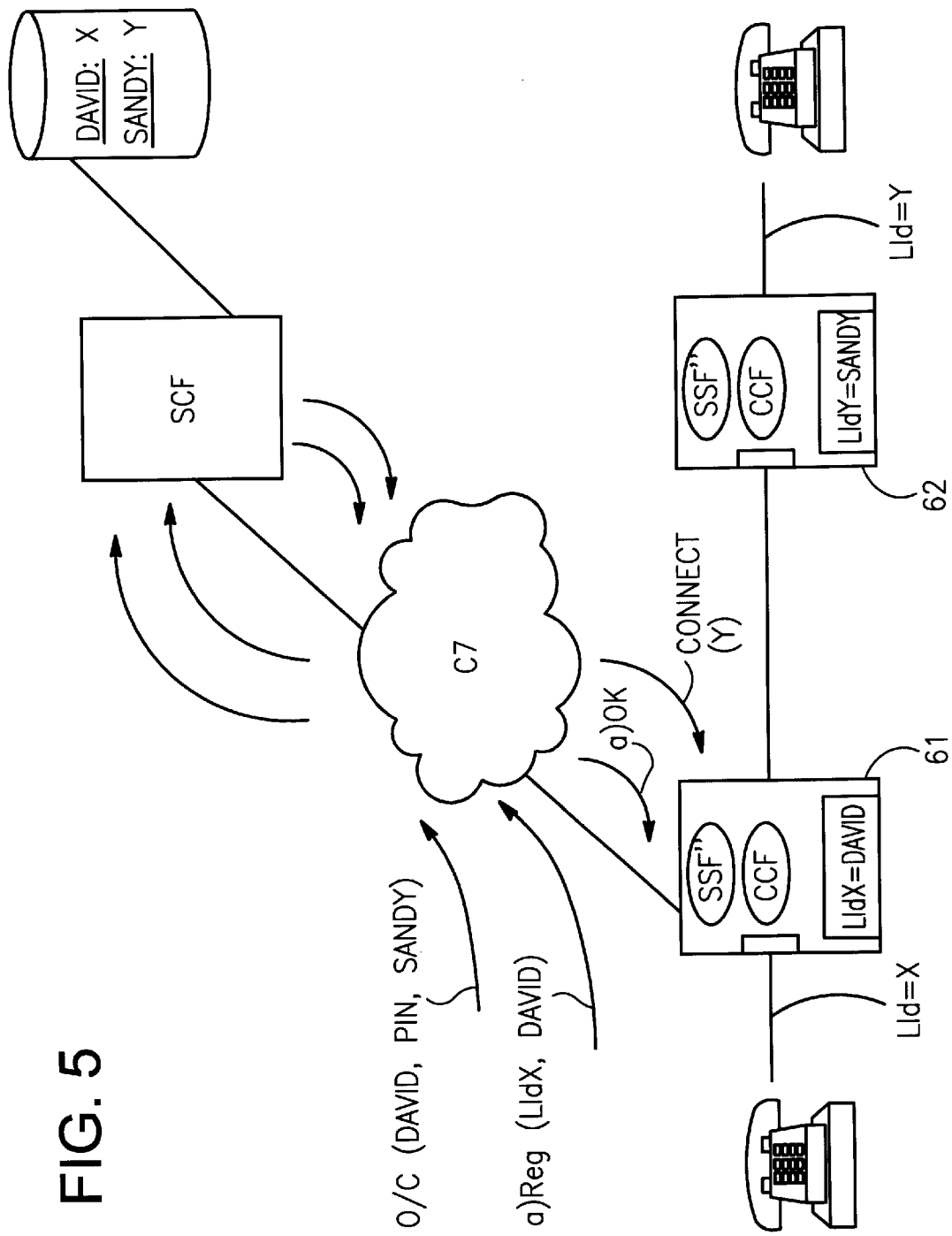
FIG. 5 is a schematic of a network configured for the personal numbering service of FIG. 4.

The functional and physical architecture which support the personal numbering service is shown in FIGS. 4 and 5.

In step a), prior to a user making a call, he registers with the system, indicating his current location on line X connected to SSP 61. This information is passed to the SCF which records in the user profile the association between a unique user name, DAVID, and the line for which the user has registered. Once a user has registered to a line he/she can make outgoing calls and can receive incoming calls on the line. The association between the customer and the line is also stored within the SSP which terminates the line.

The terminating user has also registered a unique user name SANDY and line L.d. Y, which is stored similarly.

When the originating user wishes to make an outgoing call to the terminating user then he/she authenticates access to the line which the user is registered. As the call progresses the CCF/SSF" in SSP 61 will encounter the first DP and will report this (step b), including the authentication and user data, to the service logic within the SCP. If the user data is specified by the Customer Premise Equipment then the switch would use the default user information, including, for example, the user PIN, which is stored in the switch. This approach allows a user to register to a line and make subsequent calls without having to identify him/herself to the network. This example service does not consider the scenario where more than one customer is registered to a single device, although this is possible as a simple extension of the service.

The Service logic will then access the user profile associated with the registered user to determine the service to be provisioned for the user. Accessing the user profile may involve SCP to SCP communications, possibly across network boundaries, depending on the physical location of the user's profile. When the user profile has been accessed the service provisioning will determine for the example that the user is subscribed to abbreviated dialling. The service logic will process the DP and (step c) send an instruction to the CCF/SSF in SSP 61. At the same time the SCP downloads to the SSP part of the trigger table containing data on the armed status of the relevant detection points.

The user then dials '009', which for example indicates abbreviated dialling to his partner having user name SANDY. This will progress the call processing in the CCF/SSF" to the next allowable DP which is reported to the SCF. The DP processing in the SCP will determine that the service logic must perform some processing on the DP. The service logic will perform translation of the abbreviated code and send an instruction (step d), and possibly arm/disarm event information, to the CCF/SSF" indicating the translated number to allow the call to be routed to line Y, being the line for which user SANDY is registered. The service logic may also instruct the CCF/SSF" to arm a static trigger against the line for the duration of the call to report call disconnect or unsuccessful termination.

When the call is routed to the terminating exchange SSP 62, an instance of the CCF/SSF" will be created to process the terminating end of the call. The terminating exchange will be able to make the association between the line and the terminating user. The terminating user identification will be used to allow the terminating CCF/SSF" to interact with an instance of service logic to determine service provisioning capabilities for the terminating user. Assuming that no specialised services, including divert on busy, are active the call will progress into a stable state. At this point the SSF" and SSF'/SCF instances will terminate to reduce the processing overheads within the network.

What is claimed is:

1. A method of operating a telecommunications intelligent network, said method comprising:
    switching telecommunications services at a service switching point (SSP) remote from a service control point (SCP); and
    performing detection point processing for a call switched by the SSP at the SCP remote from the SSP.
2. A method as in claim 1, including:
    storing a trigger table for detection point processing that is distributed between the SCP and the SSP.
3. A method as in claim 2, in which all of the trigger table is stored initially at the SCP, and part of the trigger table is downloaded to the SSP when a call switched by the SSP is initiated.
4. A method as in claim 1 including:
    transmitting a request for detection point processing from the SSP to the SCP when, during the progress of a call, a detection point occurs.
5. A method as in claim 4 including:
    storing a trigger table for detection point processing that is distributed between the SCP and the SSP wherein part of the trigger table comprises data indicating the armed status of a detection point locally at the SSP, and
    carrying out the step of transmitting a request for detection point processing from the SSP to the SCP only for those detection points which are armed.
6. A method as in claim 5, in which the said step of storing data includes storing arming type data indicating whether the detection point is of a request or notification type, and
    suspending the processing of a call when an armed detection point is encountered only if the detection point is of the request type.
7. A method as in claim 1 in which the SCP carries out substantially all detection point processing for the said call.
8. A telecommunications intelligent network that uses detection point processing to provide predetermined associated telecommunications services while processing a call, said network comprising:
    a service switching point (SSP); and
    a service control point (SCP) which is remote from the SSP and which includes detection point processing means for processing a call switched by the SSP.
9. A network as in claim 8, in which:
    the SCP includes a first store for storing trigger table data, and
    the SSP includes a second store for storing trigger table data,
    in use the first and second stores storing respective portions of a trigger table which is distributed between the SCP and the SSP.
10. A network as in claim 9, in which the SCP is arranged to download trigger table data to the second store in the SSP when the call switched by the SSP is initialised.
11. A network as in claim 10, in which:
    the SCP includes processor means for detection point processing, and
    the said processor means are arranged to respond to a request for detection point processing transmitted from the SSP to the SCP when, during the progress of a call, a detection point occurs.
12. A telecommunications intelligent network comprising:
    a service switching point (SSP); and
    a service control point (SCP) which is remote from the SSP, a said SCP including a detection point processor arranged to execute substantially all detection point processing required by a call switched by the SSP.
13. A telecommunications network as in claim 8, in which:
    the SSP includes a data store programmed with data indicating the armed status of a detection point, and
    the SSP is arranged to transmit a request for detection point processing to the SCP only when the said data indicates that the respective detection point is armed.
14. A service control point (SCP) for use in a telecommunications network, the SCP including:
    a signalling interface for connection via the network to a service switching point (SSP), and
    a detection point processor connected to the signalling interface and arranged to execute detection point processing for a call which, in use, is switched by the SSP.
15. A method of telecommunications call processing comprising:
    operating a service control point (SCP) to execute detection point processing for a call switched by a service switching point (SSP) which is remote from the SCP.
16. A method as in claim 15, in which the SCP executes substantially all the detection point processing for the said call.
17. A method as in claim 15 including:
    receiving from the SSP requests for detection point processing only for those detection points which are armed.
18. A method as in claim 17, including:
    receiving requests for detection point processing only for those detection points which are armed and which are of the request type.

* * * * *